United States Patent [19]

Hentschel

[11] 3,779,351
[45] Dec. 18, 1973

[54] COMPOSITE SLIDING AND ROLLING BEARING

[75] Inventor: Georg Hentschel, Schweinfurt, Germany

[73] Assignee: SKF Industrial Trading and Development Company N.V., Amsterdam, Netherlands

[22] Filed: Mar. 16, 1972

[21] Appl. No.: 235,339

[30] Foreign Application Priority Data
 Mar. 17, 1971 Germany ............... G 71 10 173.0

[52] U.S. Cl. ............................................. 192/45.2
[51] Int. Cl. ............................................ F16d 15/00
[58] Field of Search ........................... 308/210, 73; 192/45.2

[56] References Cited
UNITED STATES PATENTS
470,330   3/1892   Bersin ........................... 308/210
3,344,686  10/1967  Baker ........................... 192/45.1
3,388,779   6/1968  Roper ........................... 192/45.1
3,447,396   6/1969  Seliger .......................... 192/45.1
3,617,103  11/1971  Nakonishi ...................... 308/208

FOREIGN PATENTS OR APPLICATIONS
547,306   8/1942   Great Britain ................. 308/73

Primary Examiner—Charles J. Myhre
Assistant Examiner—Frank Susko
Attorney—Murray Schaffer

[57] ABSTRACT

A composite rolling and sliding bearing comprising an outer and inner ring and a plurality of intermediate bearing elements arranged therebetween. Each of the bearing elements is provided on one side with a convexedly formed face adapted to slide and roll against one ring and on the opposing side with suitable means for tilting or rocking the element with respect to the other ring.

11 Claims, 6 Drawing Figures

PATENTED DEC 18 1973　3,779,351

COMPOSITE SLIDING AND ROLLING BEARING

BACKGROUND OF INVENTION

The present invention relates to a composite rolling and sliding bearing particularly suitable for use in application wherein oscillating motion is effected.

Composite, anti-friction rolling and sliding bearings are in common use. Some such are disclosed in U.S. Pats. Nos. 2,986,430, 2,222,491, and 2,109,852. In one form of these conventional bearings bearing pads, sheaves, or blocks, or other insert members are arranged between the bearing rings. These members are located in grooves, formed in the rotating ring, which have a half cylindrical cross section, so that the members may be automatically inserted. This known arrangement has, however, the disadvantage, that the bearing friction, particularly during small oscillatory movements, is proportionately high. It is also no longer new to arrange between the inner and outer bearing rings, loosely set-in slide elements which abut against each other. In this arrangement the slide element can effect only a small swinging movement.

It is therefore the object of the present invention to provide a composite rolling and slide bearing, particularly suitable for oscillatory movements, in which the disadvantages of the prior devices are overcome.

It is a further object of the present invention to provide a composite rolling and slide bearing which is simple and economical to construct.

It is a further object of the present invention to provide a composite rolling and slide bearing in which the parts, subject to wear, may be easily replaced and exchanged.

Further objects as well as advantages of the present invention will be observed from the following disclosure.

SUMMARY OF INVENTION

According to the present invention a composite rolling and sliding bearing is provided comprising an outer and inner ring and a plurality of intermediate bearing elements arranged therebetween, and wherein each of the bearing elements is provided on one side with a convexedly formed face adapted to slide and roll against one ring and on the opposing side with suitable means for tilting or rocking the element with respect to the other ring.

According to a further feature of the present invention either the inner or outer ring of the bearing against which the intermediate element bears, is formed with trough like or syncline like grooves running in the axial direction. The intermediate elements are located respectively in the trough's recesses. The radius of curvature of the recess groove or trough is greater than the radius of curvature of the corresponding slide or rolling face of the intermediate element.

The intermediate element may be built from cylindrical rollers or formed out of elongated longitudinal cylindrical sections having diametrically opposite edges or shoulders, which define the extent of the convexedly curved sliding and rolling face.

Furthermore it is preferable that when the sliding or rolling surfaces of the intermediate elements is adapted to ride on a cylindrical surface of one of the rings, that is provided with a larger curvature of radius than the radius of curvature of the opposite side bearing against the other ring.

Full details of the present invention will be seen in the following description and in the accompanying drawings.

It is to be understood that the drawings are symmetrical about the central bearing axis and also symmetrical in the planes normal thereto.

DESCRIPTION OF PREFERRED EMBODIMENT

Figure 2:
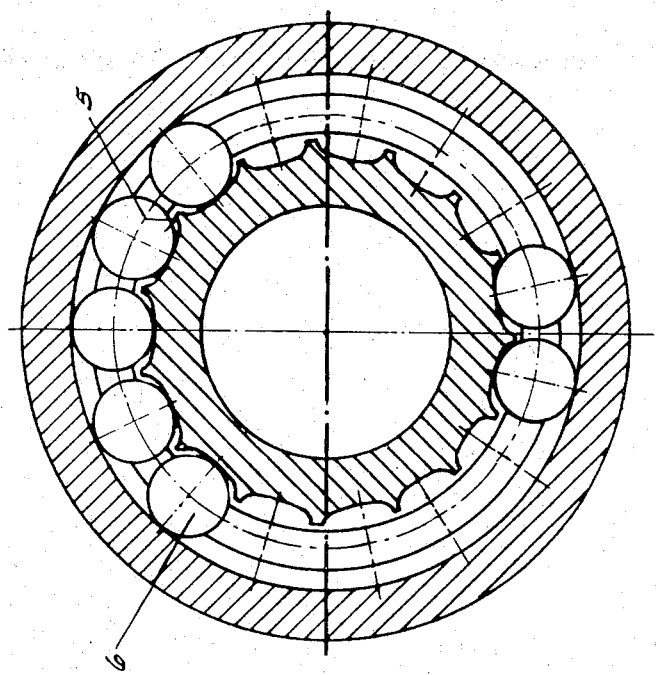
FIG. 2 is a side-sectional view of the bearing of FIG. 1.
Figure 1:
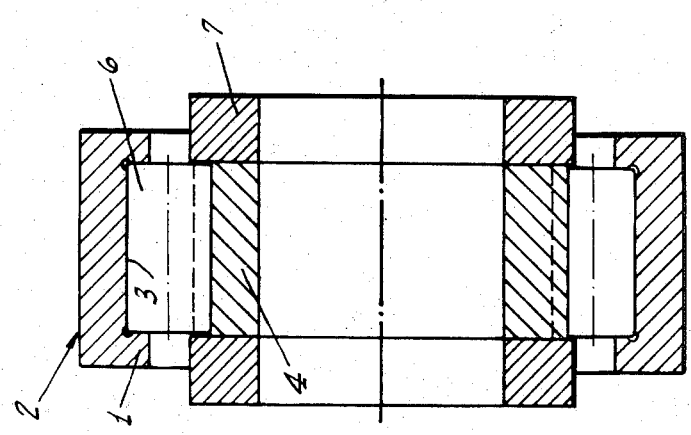
FIG. 1 is a sectional view along a plane through the bearing axis, of a rolling and sliding bearing according to the present invention employing cylindrical intermediate elements.

The rolling and sliding bearing seen in FIG. 1 and 2 comprises a pair of side rims 1 which are arranged at the outer ring 2 having a smooth cylindrical race surface 3 and an inner ring 4 whose opposing peripheral surface is provided with a plurality of scallopped troughs or syncline like grooves or recesses 5 running parallel to the axis X of the bearing. A plurality of intermediate bearing elements 6 are located between the rings 2 and 4. Adjacent each of the axial ends of the inner ring 4 is an annular ring or washer rim 7 which retains the intermediate elements in their respective grooves. The bearing may be mounted in conventional manner, as about a rotatable shaft or within a pillow block.

The intermediate elements 6 are cylindrical rollers and are respectively located in corresponding recesses 5. The radius of curvature of the recess 5 is formed larger than the radius of curvature of the cylindrical intermediate elements 6, so that a rolling (or rocking) motion can be effected by the elements with regard to the surface of the recess 5 on the start-up or initiation of movement of the shaft or other means carried by the bearing. As the rotational movement is increased, as for example by the relative movement of the outer ring 2, the intermediate elements bind and become held in the recesses 5 (as seen in the lower half of FIG. 2) so that thereafter, the outer ring 2 slides over the intermediate elements 6.

Figure 3:
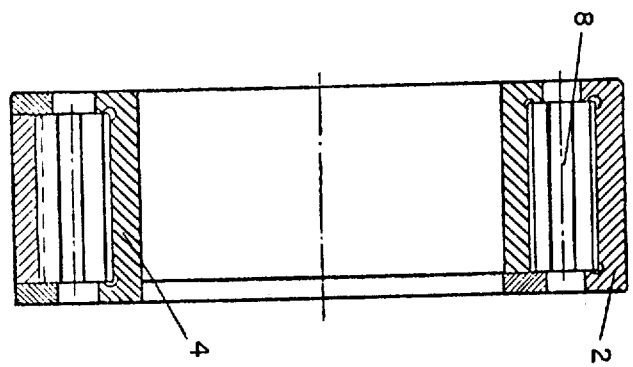
FIG. 3 is a view similar to FIG. 1 showing a bearing according to the present invention employing in the upper and lower halves intermediate elements of cylindrical sectional portions having oppositely arranged shoulders.
Figure 4:
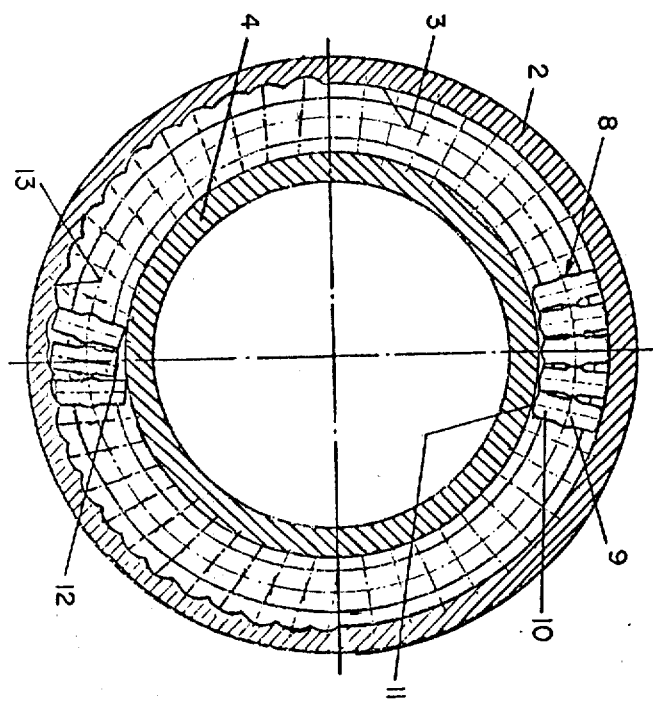
FIG. 4 is a side section view of the bearing of FIG. 3.

The embodiments shown in FIGS. 3 – 6 are similar in construction to that seen in FIGS. 1 and 2, and the arrangement of inner and outer a intermediate elements is generally the same, except that in these later Figures the intermediate elements have been modified. As seen in FIGS. 3 and 4 the intermediate elements effecting the rolling and sliding action are longitudinal sectional parts of cylinders. The intermediate elements 8 comprise elongated central cylindrical sections 9 having diametrically opposed sides 12 and convexedly curved longitudinal edges 11, the latter forming the sliding and/or rolling surfaces. Each of the diametrically opposed sides 12 has a longitudinal ear or rib 10 extending along its length, outwardly perpendicular to the central plane passing through the convexedly curved surfaces 11. The intermediate elements 8 are arranged between the inner and outer ring, so as to be adjacent each other with a slight amount of play. Consequently the rocking angle or rolling angle of the element 8 is such that the sides 12 of adjacent elements 8 are caused to abut each other after a small movement, leaving remaining between the next adjacent elements some room or play. Thus, when one element 8 hits against its next adjacent neighboring element it may cause it to move into a very precise arrangement wherein each of the contacting elements are axially directed parallel to each other. (See the lower half of FIG. 4). The outer peripheral surface of the inner ring 4, in FIGS. 3 and 4, and the race surface 3 of the outer ring 2 are both formed in the upper half of the bearing (FIG. 4) to be cylindrical, while one of the rings (as seen here the outer ring 2) is formed on its lower half with trough-like recesses 13 running parallel to the bearing axis, in which the intermediate elements 8 are located and engage. The radius of curvature of the trough-like recesses 13 is greater than the rolling or sliding surface of th intermediate elements 8, so that by a small working or oscillatory amplitude no sliding action is effected, but only a rolling or rocking action develops between the contacting faces.

Figure 6:
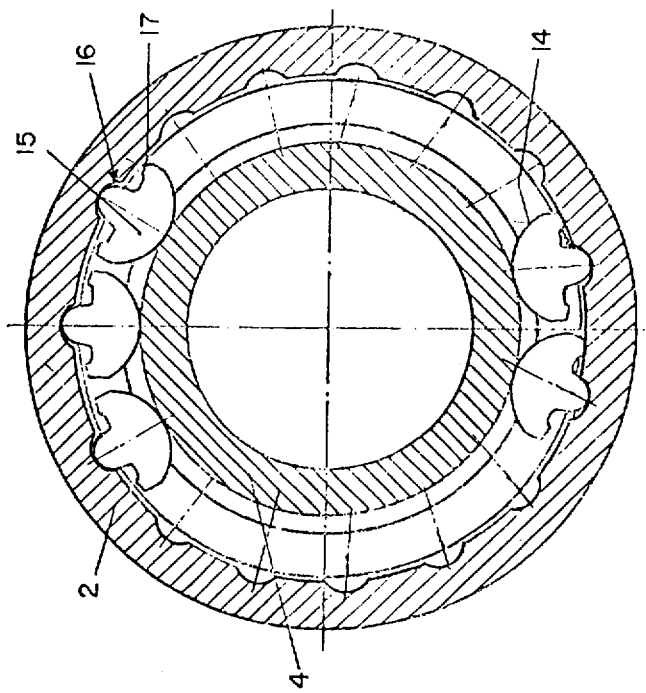
FIG. 6 is a side section of the bearing of FIG. 5.
Figure 5:
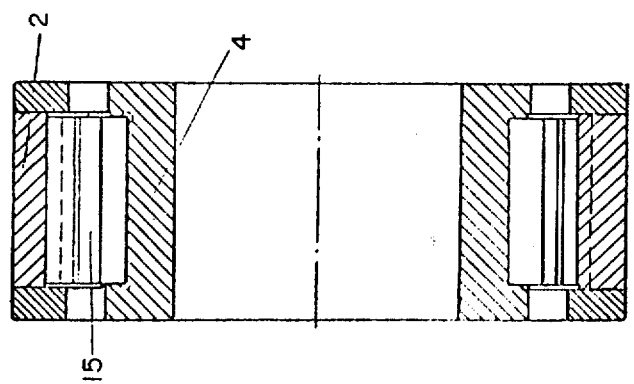
FIG. 5 is a view similar to FIG. 1 of bearing according to the present invention in which the rolling and slide surfaces have different radii of curvature.

As seen in FIG. 5 and 6 the intermediate element 15 is also formed of a longitudinal section of a cylinder. It is provided with a convexedly curved sliding and/or rolling face 14 adapted to bear and contact against the cylindrical surface of an inner ring 4, and a radially opposite sliding or rolling edge 16 and adapted to set within a recess formed in the opposing race face of the outer ring 2. The rocking of the element 15 is defined by a pair of diametrically located ears or projections 17 (as seen in the lower half of FIG. 6) which hit against the surface of the ring 2 on tilting or rocking of the elements 2. The elements 15 seen in FIG. 5 and 6 permit a rather large rolling or rocking movement between the rings so that large oscillating movements of the rotating shaft etc. can be effected.

As will be seen from each of the foregoing embodiments the intermediate member is formed on one side, where it contacts one ring, with a composite sliding and rolling face which is convexedly curved and on the opposite side where it contacts the other ring with suitable means for rocking or tilting the element on oscillating movement.

Further, the troughs or recesses may be fromed on either the inner or outer race ring as desired. Either ring may be driven by the shaft or other means borne by the bearing. The troughs may be extended about the entire circumference of the ring on which they are made or over only a part of the circumference. Compare FIGS. 1 and 2 with 3 and 4.

The exact form of the intermediate elements may also vary, provided the convexedly curved sliding and rolling surface is maintained and the rocking means are provided oppositely to it.

The radius of curvature of the sliding and rolling face is smaller than its associated recess permitting the initial rolling action and subsequent sliding action. Similarly, the radius of curvature of the rocking or tilting means should not be greater to insure the proper rocking action.

It will be noted that in the embodiment of FIGS. 5 and 6 both sides 14 and 16 of the intermediate elements are formed with convexedly composite sliding and rocking surfaces. The smaller surface 16 being set with a transverse groove establishing the rocker or pivot point of the elements.

It will be noted that in each embodiment the intermediate members may be easily removed merely by removing one of the rims which hold them axially in place.

The intermediate elements shown in FIGS. 1 – 6 may be made of steel, bronze or other metallic material, or even synthetic materials such as partially metallic material or even plastics.

The foregoing description is illustrative only of the present invention and since various modifications and changes can be made, the description should not be taken as limiting of the invention.

What is claimed:

1. A composite sliding and rolling bearing composing an inner and outer ring, one of said rings having a cylindrical race surface, the other of said rings having its race surface provided with a plurality of parallel aligned recesses running axially of said rings, and cylindrical intermediate elements freely located between said rings, each of said elements being formed with a convexedly curved surface engaging the cylindrical race surface of the one race ring for composite rolling and sliding and a diametrically opposite convex surface located in the corresponding recesses of the other race ring, said recesses and the opposite convex surface cooperating to rock said intermediate element relative thereto on rotation of one of said rings.

2. The bearing according to claim 1 wherein the radius of curvature of said recesses is greater than that of the radius of curvature of the corresponding surface of said intermediate element.

3. The bearing according to claim 1 wherein the radius of curvature of surface engaging the cylindrical race surface is larger than the radius of curvature of said surface located in said recess.

4. The bearing according to claim 1 wherein the recesses have radially extending walls which fixedly engage the sides of said intermediate elements located therein and prevent radial displacement thereof.

5. The bearing according to claim 1 wherein said intermediate element is a cylindrical roller.

6. The bearing according to claim 1 wherein said intermediate element is a longitudinal cylindrical section having its convexedly curved surface running along the longitudinal edges and having side faces on which transversely extending projections are formed.

7. The bearing according to claim 6 wherein said recesses are spaced circumferentially from each other and said projections formed so that on rocking of said elements, the projections of said adjacent rocking elements engage each other to limit the extent of rocking.

8. The bearing according to claim 6 wherein said projections extend outwardly of the side face a distance sufficient to engage the surface of said one ring on rocking of said elements to limit rocking thereof.

9. The bearing according to claim 8 wherein the race surface of the other ring is cylindrical.

10. A composite sliding and rolling bearing comprising an inner and outer ring, at least one of said rings having a cylindrical race surface, intermediate elements freely located between said rings, each of said elements being formed with a convexedly curved surface engaging the cylindrical race surface of one race ring for composite rolling and sliding and a diametrically opposite convex surface engaging the race surface of the other ring, said race surface of the other ring and the opposite convex surface cooperating to rock said intermediate element relative thereto on rotation of one of said rings.

11. The bearing according to claim 9 wherein said intermediate element is a longitudinal cylindrical section having its convexedly curved surface running along the longitudinal edges and having side faces on which transversely extending projections are formed, said elements being arranged so that said projections abut each other to define the rocking of said elements.

* * * * *

UNITED STATES PATENT OFFICE
CERTIFICATE OF CORRECTION

Patent No. 3,779,351   Dated   December 18, 1973

Inventor(s) GEORG HENTSCHEL

It is certified that error appears in the above-identified patent and that said Letters Patent are hereby corrected as shown below:

Add the attached two sheets of drawings containing Figures 3 through 6.

Signed and sealed this 6th day of August 1974.

(SEAL)
Attest:

McCOY M. GIBSON, JR.
Attesting Officer

C. MARSHALL DANN
Commissioner of Patents